US010895963B2

(12) United States Patent
Argutin et al.

(10) Patent No.: US 10,895,963 B2
(45) Date of Patent: Jan. 19, 2021

(54) USING SECTIONS FOR CUSTOMIZATION OF APPLICATIONS ACROSS PLATFORMS

(71) Applicant: Microsoft Technology Licensing, LLC, Redmond, WA (US)

(72) Inventors: Alexander Argutin, Issaquah, WA (US); Sudarsanan Krishnan, Bothell, WA (US); Janeth Guerrero Gomez, Duvall, WA (US); Robert A. Drollinger, Bellevue, WA (US); David J. Runde, Bellevue, WA (US); Jorn Mortensen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 15/975,954

(22) Filed: May 10, 2018

(65) Prior Publication Data

US 2018/0335909 A1 Nov. 22, 2018

Related U.S. Application Data

(63) Continuation of application No. 14/687,073, filed on Apr. 15, 2015, now Pat. No. 9,996,230.

(60) Provisional application No. 62/079,179, filed on Nov. 13, 2014.

(51) Int. Cl.
*G06F 8/60* (2018.01)
*G06F 3/0484* (2013.01)
*G06F 9/451* (2018.01)
*H04L 29/08* (2006.01)

(52) U.S. Cl.
CPC .............. *G06F 3/0484* (2013.01); *G06F 8/60* (2013.01); *G06F 9/451* (2018.02); *H04L 67/10* (2013.01); *H04L 67/34* (2013.01)

(58) Field of Classification Search
CPC . G06F 8/60; G06F 3/0484; G06F 8/65; G06F 9/451; G06F 3/0482; H04L 67/34; H04L 67/10
See application file for complete search history.

(56) References Cited

U.S. PATENT DOCUMENTS

| 7,853,899 B1 | 12/2010 | Damaschke et al. |
| 8,788,542 B2 * | 7/2014 | Barrow .................... G06F 40/14 |
| | | 707/803 |
| 8,949,370 B1 * | 2/2015 | Wu ......................... H04W 4/60 |
| | | 709/217 |
| 9,483,449 B1 * | 11/2016 | Wood ..................... G06F 16/957 |

(Continued)

FOREIGN PATENT DOCUMENTS

| CN | 101315604 A | 12/2008 |
| CN | 101350023 A | 1/2009 |

OTHER PUBLICATIONS

"Office Action issued in European Patent Application No. 15795280.5", dated Oct. 25, 2019, 4 Pages.

(Continued)

*Primary Examiner* — Dino Kujundzic
(74) *Attorney, Agent, or Firm* — Christopher J. Volkmann; Kelly, Holt & Christenson, PLLC

(57) ABSTRACT

A client-based application includes sections that are used to define user interface displays for the system. The sections are customizable by a backend system so customizations are accommodated by modified versions of the mobile application.

18 Claims, 17 Drawing Sheets

(56) References Cited

U.S. PATENT DOCUMENTS

| | | | | |
|---|---|---|---|---|
| 2005/0060648 A1* | 3/2005 | Fennelly | ............... | G06F 16/957 715/236 |
| 2005/0097180 A1* | 5/2005 | Abdelhak | ............. | G06F 16/954 709/208 |
| 2007/0206221 A1* | 9/2007 | Wyler | ................ | G06F 16/9577 358/1.15 |
| 2009/0254601 A1* | 10/2009 | Moeller | ................. | G06F 9/542 709/201 |
| 2012/0079009 A1* | 3/2012 | Carter | ................ | G06F 16/9577 709/203 |
| 2013/0132875 A1 | 5/2013 | Allen et al. | | |
| 2014/0229818 A1* | 8/2014 | Goswami | ........... | G06F 16/9577 715/234 |
| 2014/0304682 A1* | 10/2014 | Taylor | ...................... | G06F 9/44 717/113 |
| 2014/0372400 A1* | 12/2014 | Ramachandran | ..... | G06F 16/951 707/706 |
| 2015/0106751 A1* | 4/2015 | Farjo | .................... | G06F 16/972 715/760 |

OTHER PUBLICATIONS

"First Office Action and Search Report Issued in Chinese Patent Application No. 201580061794.5" dated Nov. 4, 2019, 7 Pages.

\* cited by examiner

USING SECTIONS FOR CUSTOMIZATION OF APPLICATIONS ACROSS PLATFORMS

CROSS-REFERENCE TO RELATED APPLICATIONS

The present application is a continuation of and claims priority of U.S. patent application Ser. No. 14/687,073, filed Apr. 15, 2015, which is based on and claims the benefit of U.S. provisional patent application Ser. No. 62/079,179, filed Nov. 13, 2014, the contents of which are hereby incorporated by reference in their entirety.

BACKGROUND

Computer systems are currently in wide use. Some such computer systems are sold by a manufacturer and then heavily customized before they are deployed for a given organization.

By way of example, some enterprise computer systems are generated by a computer system manufacturer. They are then often modified by multiple different individuals before they are deployed at an enterprise organization. For instance, the base computer system sold by the manufacturer may be modified by an independent software vendor (ISV), by various different developers, and even by developers at the organization that will eventually deploy it. This can be done because the needs of an individual organization may be different from other organizations. Thus, the organizations change or customize the systems to fit their individual needs.

Some examples of these types of computer systems include electronic mail systems, collaboration systems, business systems (such as customer relations management systems, enterprise resource planning systems, line-of-business systems, among others), document sharing systems, database management systems, and a wide variety of others. In some architectures that use these types of computer systems, a backend computer system is used to perform some of the processing for the computer system. However, users interact with the backend system through various client devices, such as mobile devices (smart phones, smart phones with large screens such as phablets, tablet computers, among others), laptop computers, desktop computers, etc. Some of the client devices (such as the mobile devices) run a client-based application (such as a mobile application) that the client device uses to connect to the overall system. The mobile applications enable users to easily access and enter data into backend systems, using their mobile device.

This type of architecture presents certain challenges. For instance, where the backend system is customized, the mobile applications may need to be reconfigured in order to interact properly with the backend system. Some mobile applications address this by allowing users to use the built-in functionality of the mobile application, or to only change it through settings. Others provide access to source code for the mobile applications and thereby allow organizations to change it and create customized versions of the mobile applications.

All of these different mechanisms present significant disadvantages. Some limit the flexibility of the system to the built-in functionality or to controls and patterns that are supported by the underlying framework. Some others (where changes to source code are made) require a software vendor to handle, and potentially re-implement, the applications or even the backend systems when changes are made to either the original version of the mobile application or to the backend system.

The discussion above is merely provided for general background information and is not intended to be used as an aid in determining the scope of the claimed subject matter.

SUMMARY

A client-based application includes sections that are used to define user interface displays for the system. The sections are customizable by a backend system so customizations are accommodated by a single version of the mobile application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
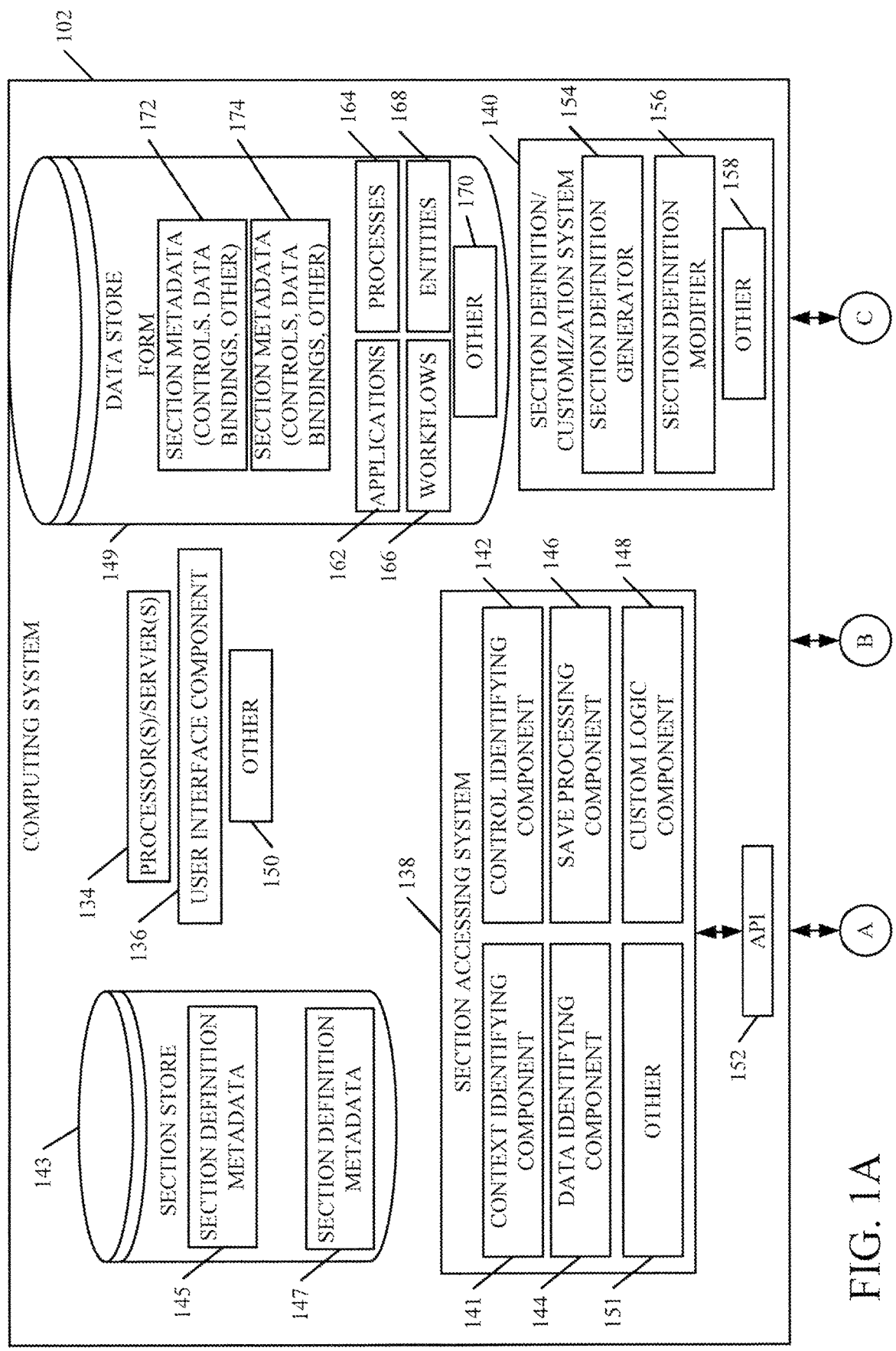
FIGS. 1A and 1B (collectively referred to herein as FIG. 1) show one example of a block diagram of a computing system architecture.
Figure 1B:
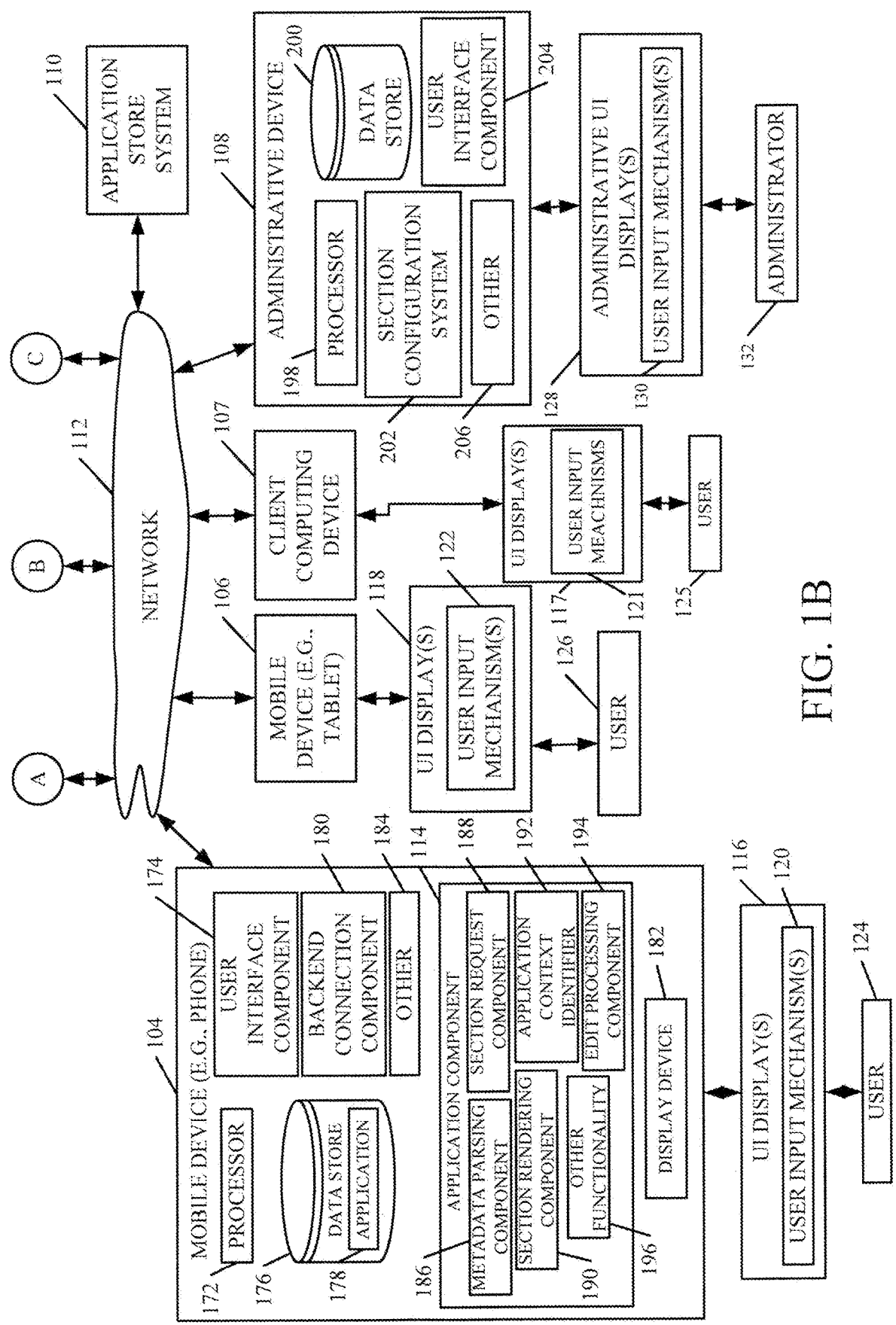

FIG. 1 is a block diagram of one example of a computing system architecture 100. Architecture 100 illustratively includes computing system 102 (which may be a backend computing system), a plurality of mobile devices 104-106 one or more other client devices 107, an administrative device 108, and an application store system 110. Systems 102 and 110 can be accessed by devices 104, 106, 107 and 108 over a network 112. Network 112 can be a local area network, a wide area network, a near field communication network, a cellular network, a wide variety of other networks, or any combination of such networks.

In one example, each of the mobile devices 104-106 and client device 107 include an application component 114 that runs a client-based application (e.g., a mobile application) that allows the corresponding mobile device or client device to interact with computing system 102. The client-based applications illustratively generate user interface displays 116-118, with corresponding user input mechanisms 120-122 for interaction by users 124-126. Users 124-126 illustratively interact with user input mechanisms 120-122 in order to control and manipulate computing system 102, through the client-based applications.

Administrative device 108 illustratively generates administrative user interface displays 128 with user input mechanisms 130 for interaction by an administrator 132. Administrator 132 illustratively interacts with user input mechanisms 130 in order to perform administrative operations in computing system 102. The various devices and systems shown in FIG. 1 can illustratively access and download applications from application store system 110.

Before describing the operation of architecture 100 in generating user interface displays with sections, a brief overview of some of the items in architecture 100, and their operation, will first be described. In one example, computing system 102 is a backend computing system that includes one or more processors or servers 134, user interface component 136, section accessing system 138, section definition/customization system 140, section store 143 (that includes section definition metadata 145 and 147 that define a plurality of different sections), data store 149, and it can include other items 150 as well. Section accessing system 138 illustratively allows mobile applications (or other client-based applications) on various devices to access sections defined by section definition metadata 145 and 147 in order to generate user interface displays.

In the example shown in FIG. 1, system 138 illustratively includes context identifying component 141, control identifying component 142, data identifying component 144, save processing component 146, custom logic component 148, and it can include other items 151. Context identifying component 141 illustratively identifies a context of a call received from a mobile device or other client requesting access to a section. Control identifying component 142 identifies the controls that are defined on the requested section, and data identifying component 144 identifies data bindings to those controls. Custom logic component 148 can be used to perform custom processing on the data, and save processing component 146 illustratively handles save operations when they are requested by a mobile device or other client. System 138 illustratively exposes an application programming interface (API) 152 that can be used by mobile devices or other client devices to access system 138.

Section definition/customization system 140 can be used (e.g., by administrator 132) in order to define new sections or to customize sections for the particular organization that is deploying system 102. Thus, system 140 illustratively includes section definition generator 154, section definition modifier 156, and it can include other items 158. Section definition generator 154 includes functionality that allows administrator 132 to define various sections and save them to section data store 143. Section definition modifier 156 includes functionality that allows administrator 132 to modify the section definition metadata for various sections stored in data store 143. It will be noted that administrator 132 need not be considered a definition of a specific user role, but is a reference to a user who can administrate, change, configure or customize section definitions or other section metadata, or the like. This might include, for example, a backend system developer, an ISV, a system administrator, etc.

Data store 149 illustratively stores a set of forms 160, applications 162, processes 164, workflows 166, entities 168, and it can store other items 170. Data store 149 can also include a set of sections 172-174 that each include section metadata that defines controls, data bindings, and/or other items to be displayed in a given section of a user interface display.

Applications 162 can illustratively be run by processors or servers 134 to implement processes 164 or workflows 166. They can perform operations on entities 168 which can represent data items within system 102. In an example in which system 102 is an enterprise resource planning system or a customer relations management system, for instance, entities 168 can define and represent items within those systems. For instance, a customer entity can define and represent a customer. A product entity can define and represent a product. A quote entity can define and represent a quote that is made to a potential customer. An opportunity entity can define and represent a business opportunity that is being tracked within the system. These are examples only and a wide variety of other or different entities can be used as well.

In the example shown in FIG. 1, one example of a mobile device 104 can be a smart phone or mobile phone. In another example, mobile device 106 can be a tablet computer or another computer. Other client computing devices 107 can be desktop computers, laptop computers, among others.

In the example shown in FIG. 1, mobile device 104 illustratively includes processor 172, user interface component 174, data store 176, which can store one or more applications 178, backend connection component 180, application component 114, display device 182, and it can include other items 184. Application component 114 can illustratively be used to run applications 178 on mobile device 104. Component 114 can illustratively include metadata parsing component 186, section request component 188, section rendering component 190, application context identifier 192, edit processing component 194, and it can include other functionality 196.

Backend connection component 180 is illustratively used by the application to connect to computing system 102. Section request component 188 illustratively requests sections that can be used to render a user interface display. Application context identifier 192 can be used to identify the context of a given application (such as the identity of the application, what forms are open on the application, etc.) so that the context information can be sent along with the section request.

Metadata parsing component 186 illustratively parses metadata received from system 102, corresponding to a given section. The metadata can identify the various controls and data bindings for the section, and section rendering component 190 illustratively renders the section based upon the parsed metadata. The data inside a section may be editable. When user 124 edits the data on a given form or other user interface display, edit processing component 194 receives the user inputs editing the data and can be used to provide an indication of those edits back to system 102, where they are handled by save processing component 146 in section accessing system 138. When the data is read only, then saving and editing components are not needed. A description of additional features of various mobile devices is provided below with respect to FIGS. 8-10.

Administrative device 108 illustratively includes processor 198, data store 200, section configuration system 202, user interface component 204, and it can include other items 206, as well. Section configuration system 202 illustratively includes functionality that allows administrator 132 to configure the various sections in data store 143. Administrator 132 can thus illustratively customize sections. Administrator 132 can also illustratively write custom code or logic that can be run by custom logic component 148 on data in the various sections.

Figure 1C:
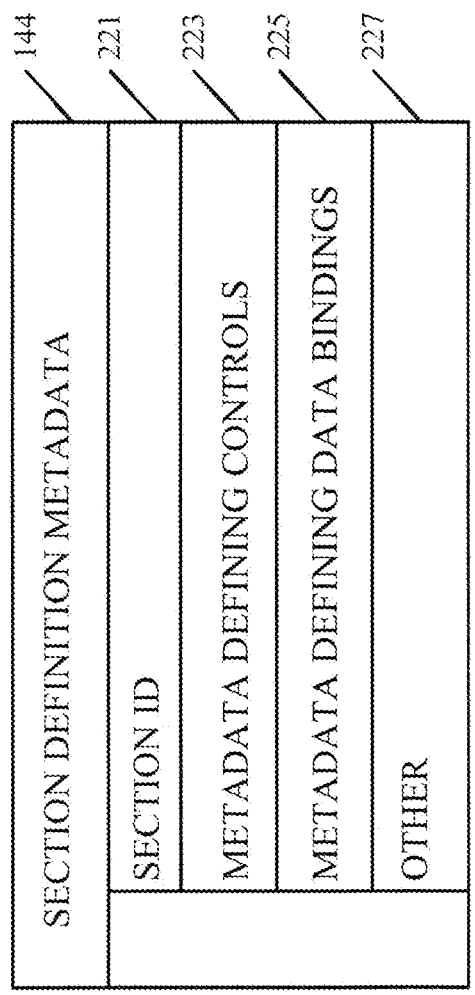
FIG. 1C shows one example of a block diagram of a set of section metadata.

FIG. 1C is one example of a set of section definition metadata 145 that can be used to define a section. In the example shown in FIG. 1C, section definition metadata 145 illustratively includes a section identifier (or section ID) 221 which uniquely identifies the section being defined. It can include metadata 223 that defines the behavior that the client application will use to display data in various controls that are to appear in the section. For instance, the controls may include a chart, grid, table, text box, check box, or a wide variety of other controls. Metadata 145 also illustratively includes metadata defining the data bindings 225 that bind the data to the controls. The section definition metadata 145 can include other items 227 as well.

Figure 2A:
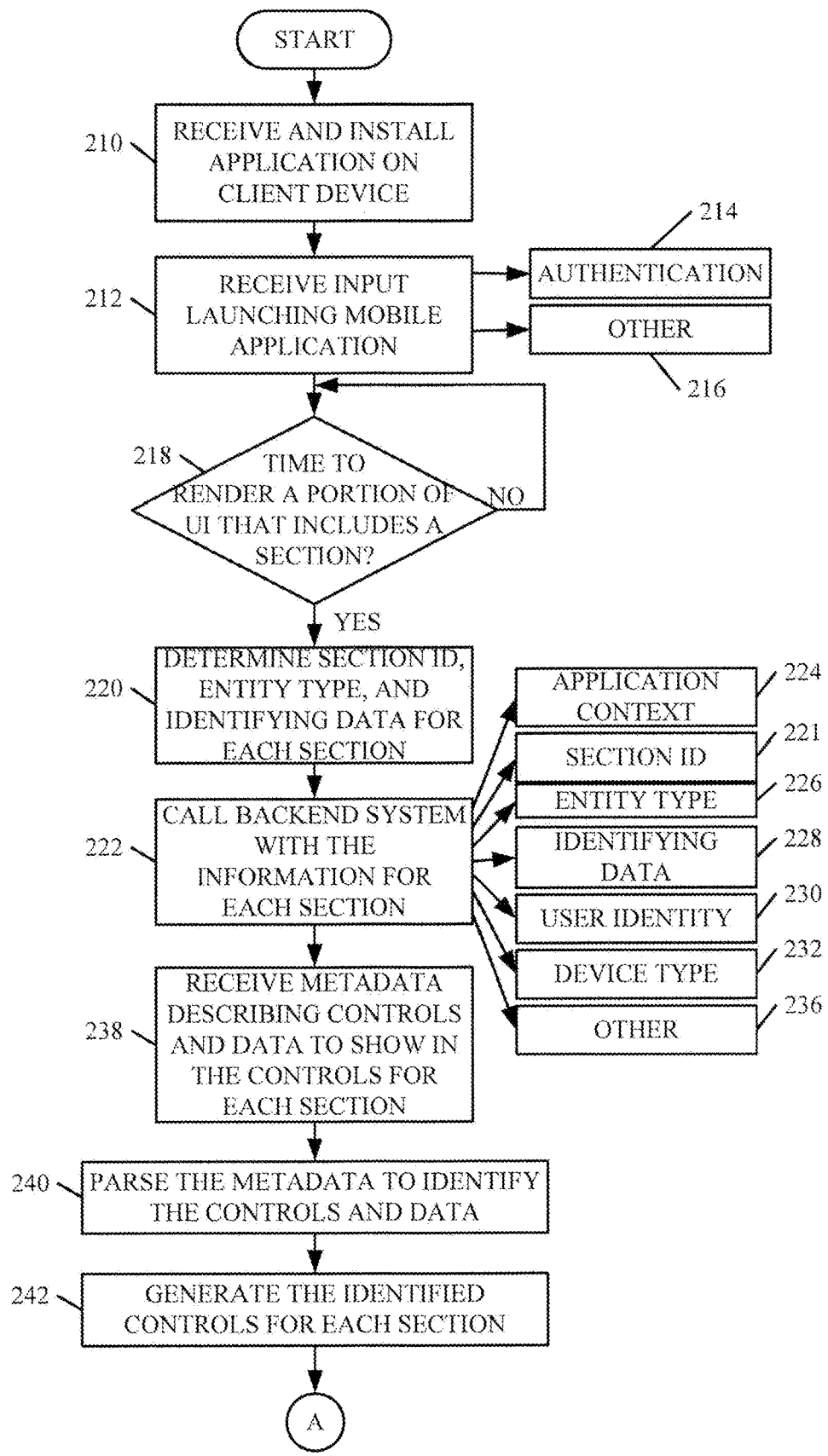
FIGS. 2A and 2B (collectively referred to herein as FIG. 2) show one example of a flow diagram of the operation of the architecture shown in FIG. 1 in generating user interface displays with sections.
Figure 2B:
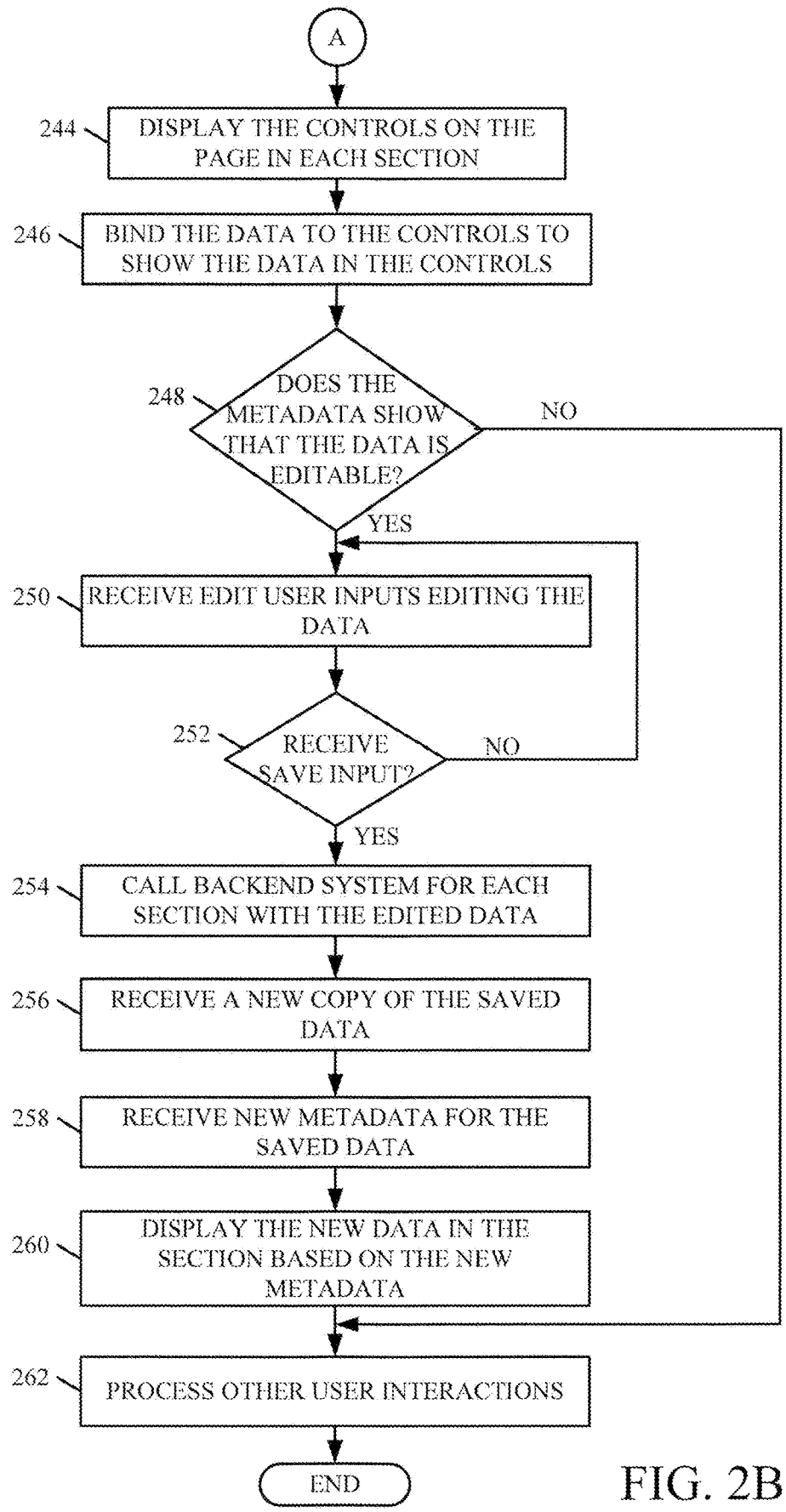

FIGS. 2A and 2B (collectively referred to herein as FIG. 2) show one example of a flow diagram illustrating the operation of architecture 100 in generating user interface displays on mobile devices using sections. In one example, the user 124 of mobile device 104 first provides inputs that allow mobile device 104 to receive and install the mobile application 178 from application store system 110. This is indicated by block 210. For instance, user 124 can navigate mobile device 104 to a page on application store system 110, using a browser. User 124 can then download the application from application store system 110 using any of a wide variety of different types of download mechanisms. User 124 also thus illustratively provides inputs so that processor 172 installs application 178 on mobile device 104 so that it can be used.

Mobile device 104 then receives user inputs (or other inputs) launching application 178. This is indicated by block 212 in FIG. 2. For instance, user 124 can enter authentication information 214 and launch the application. The user can provide other inputs, or other computing systems can provide inputs, to launch application 178. This is indicated by block 216.

At some point, during the operation of application 178, the application 178 will be controlled to generate and render a user interface display (such as a form 160), at least part of which is defined by one or more sections. This is indicated by block 218. At that point, section request component 188 uses application context identifier 192 to identify various context information indicative of the context of the application 178. It can also illustratively determine the section identifier that identifies sections that are on the form to be displayed. It can also identify the entity type for which the form is displayed, and it can obtain other identifying data for each section that is to be displayed on the user interface display (e.g., on the form). Obtaining the section ID, entity type, other identifying data and context information is indicated by block 220 in FIG. 2.

When the appropriate information is obtained in order to identify the section that is being requested, section request component 188 uses backend connection component 180 to call system 102 with the information for each section in the user interface display to be displayed. This is indicated by block 222 in FIG. 2. Again, the call can include application context data 224, a section identifier 221, entity type information 226 that identifies the entity type for the corresponding form or user interface display being displayed, identifying data 228 that identifies the data bound to the section, and it can also include user identity 230, device type information identifying the type of device that is making the call, as indicated by block 232, or other information 236.

The section ID 221, application context 224, entity type 226, identifying data 228, user identity information 230 and device type information 232 (as well as other information 236) can be used by custom logic component 148 in system 138 (shown in FIG. 1) to generate a custom representation of the section that is returned by system 102. Thus, the particular rendering of a given section can be customized to individual users, to individual device types, etc. These are examples only, and some are described in greater detail below.

In response, system 102 generates metadata describing the controls, and data to show in those controls, for each section. The operation of system 102 in responding to the call is described in greater detail below with respect to FIG. 4.

It should be noted that mobile device 104 need not wait for a response to the call. Instead, it can continue to perform other processing.

Section rendering component 190, through backend connection component 180, eventually receives the metadata describing the various controls, and the data to show in those controls, for each section that was identified in the call to backend system 102. Receiving that metadata is indicated by block 238 in FIG. 2.

Metadata parsing component 186 then parses the received metadata to identify the particular controls and the corresponding data. This is indicated by block 240.

Section rendering component 190 then generates the identified controls for each section to be displayed. This is indicated by block 242. It displays the controls on the page, in each corresponding section. This is indicated by block 244. It then binds the data to those controls to show the data in the displayed controls. This is indicated by block 246.

In one example, the metadata returned by system 102 not only describes what controls to show and the data to show in them, but it also indicates whether the data in each given control is editable by user 124. For instance, system 138 may access a set of permissions, access control settings corresponding to the data, or a wide variety of other information to determine whether user 124 can edit the data. The metadata returned by system 102 will thus indicate this. If it is editable, user 124 may provide edit inputs modifying the data. Determining whether the data is editable and receiving edit user inputs editing the data is indicated by blocks 248 and 250 in FIG. 2.

Edit processing component 194 illustratively generates user input mechanisms and receives user inputs through them that allow user 124 to perform edit operations on the displayed data. As one example, the metadata may indicate that a field section is marked as mandatory. If that is the case, then the user may be required to enter a value in the field. Other edits can be made as well. At some point, user 124 may wish to save the edits that have been made. Receiving the save input is indicated by block 252. Edit processing component 194 then generates a call to backend system 102 (e.g., through backend connection component 180) for each section that has been edited. The call illustratively includes the edited data. Generating a call to the backend system 102 with the edited data is indicated by block 254 in FIG. 2.

In processing the edited data, it may be that save processing component 146 simply saves the edited data to data store 149. However, it may also be that custom logic component 148 can run custom logic on the saved data to modify it prior to being saved. Therefore, in one example, save processing component 146 also sends back a new copy of the saved data to mobile device 104, along with the new metadata for the saved data. This is indicated by blocks 256 and 258 in FIG. 2. Metadata parsing component 186 then parses the new metadata and section rendering component 190 renders the new display with the sections on the form being displayed, based upon the new metadata that is received. This is indicated by block 260. It will be appreciated, of course, that user 124 can provide other inputs through the mobile application, and those user interactions are processed as well. This is indicated by block 262.

Figure 3A:
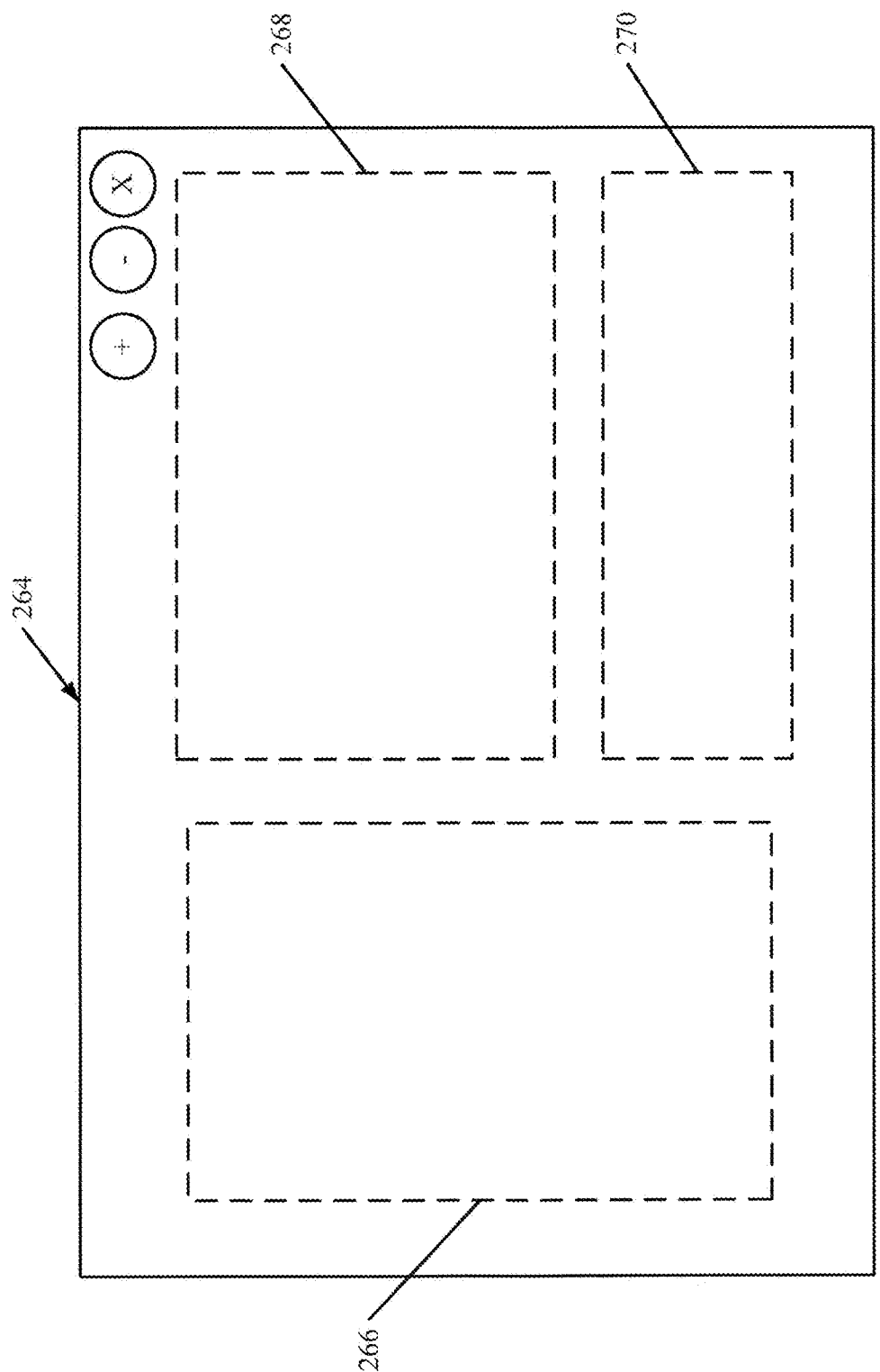
FIGS. 3A-3C show various examples of user interface displays with sections.
Figure 3B:
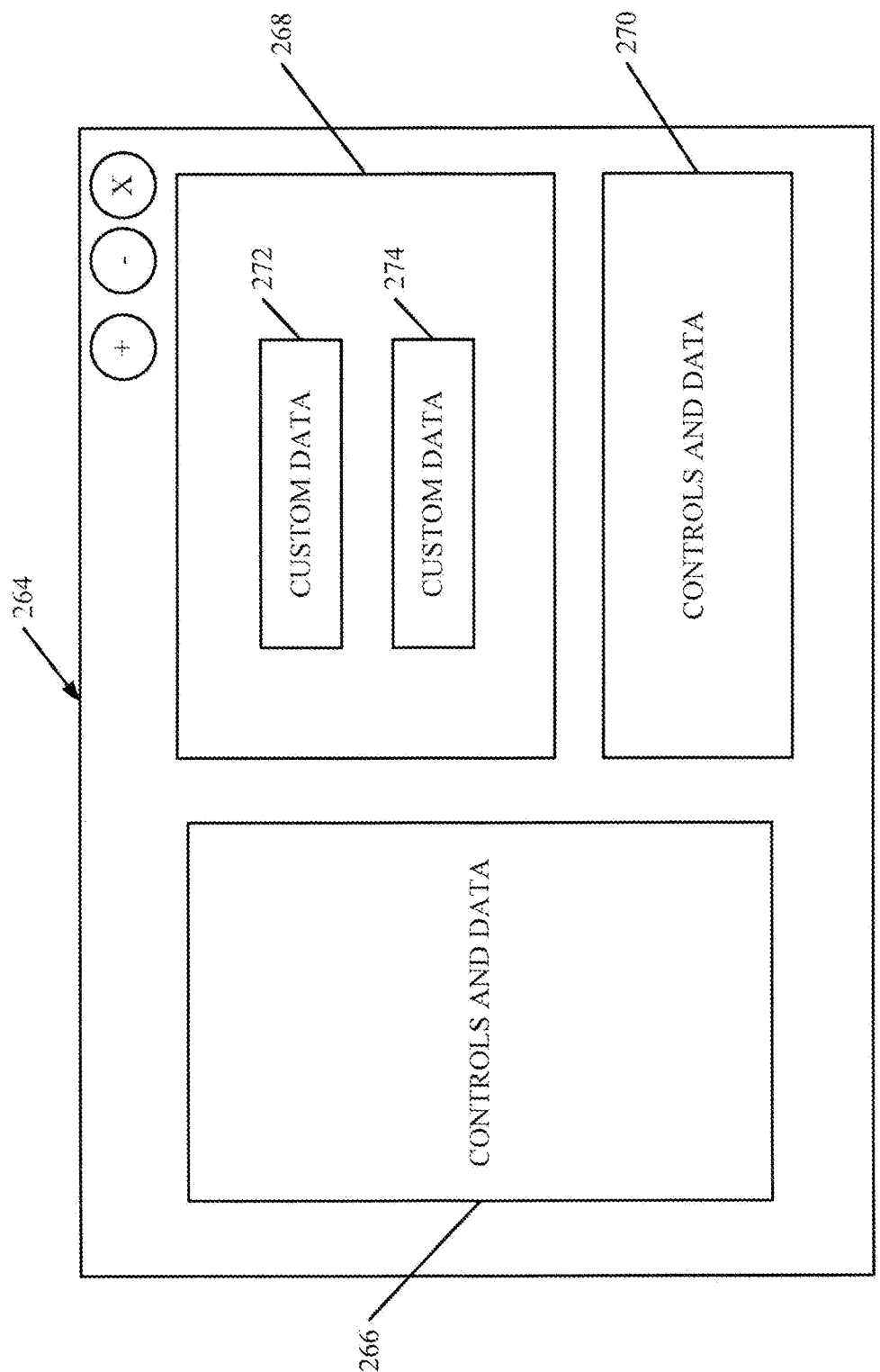
Figure 3C:
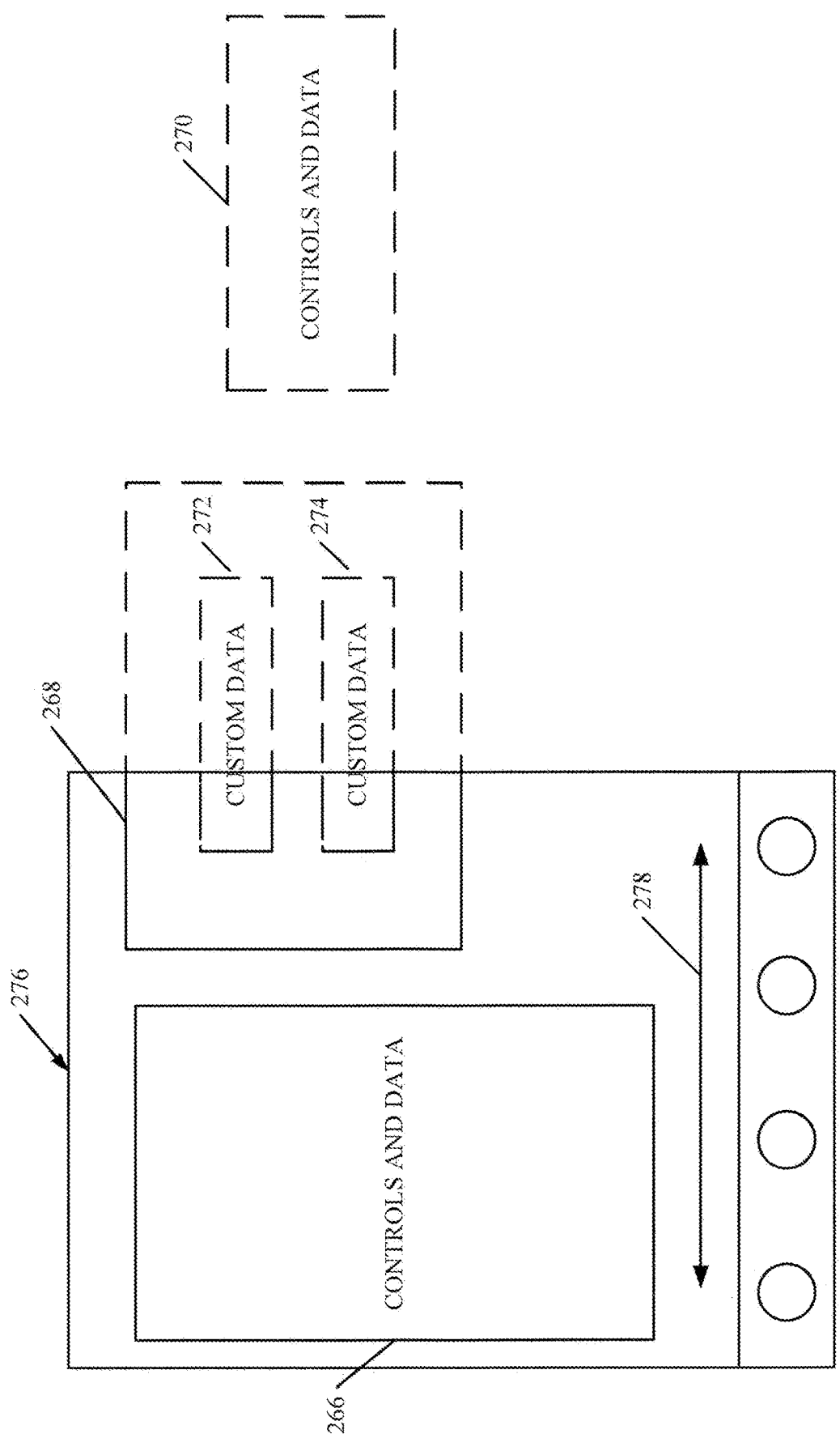

FIGS. 3A-3C show a plurality of examples of user interface displays indicating some of the items discussed above with respect to FIGS. 1 and 2. FIG. 3A, for instance, shows one example of a user interface display (such as display 116 or 118). The user interface display can be displayed on a display device, and is indicated generally at 264. In the example shown in FIG. 3A, the particular user interface display has three different sections 266, 268 and 270, corresponding to it. Each different section is illustratively defined by section definition metadata in section store 143.

Thus, when the mobile application being run on mobile device 104 wishes to display the particular user interface display that contains sections 266-270, section request component 188 obtains the section identifier for each of sections 266-270, along with any other desired context information, possibly including the context of the application, the identity of the user, the identity of the mobile device, etc., and calls section accessing system 138 (e.g., through API 152) to obtain the metadata corresponding to each of those sections. System 138 returns the metadata for each of those sections, and they can then illustratively be rendered by section rendering component 190. FIG. 3B shows that display 264 now includes the controls and data that correspond to each of sections 266, 268 and 270. In the example shown in FIG. 3B, section 268 includes two text box controls 272 and 274, each of which display customized data. Thus, it can be seen that administrator 132 has customized section 268 to include custom control metadata that is dynamically determined by the application to be displayed as text box controls 272 and 274 that display customized data. Sections 266 and 270, on the other hand, display the controls and corresponding data that is bound to them, without any customizations. FIG. 3B shows that user interface display 264 is displayed on a relatively wide display device, such as one found on a tablet computer, a laptop computer, etc.

FIG. 3C shows that, in one example, the metadata returned by system 138 can be modified based upon the type of device where it is to be rendered. FIG. 3C shows, for instance, that mobile device 104 is a smart phone 276. Therefore, the display screen is relatively small, compared to that shown in FIGS. 3A and 3B. Thus, instead of displaying the user interface display 264 with the sections as arranged in FIG. 3B, the sections are arranged in a generally horizontal direction, and they are scrollable in the direction indicated by arrow 278. Thus, FIG. 3C shows that the entire section 266 is displayed on the smart phone 276 along with a portion of section 268. However, in order to see the remainder of section 268, and section 270, the user must scroll the display to the left using an appropriate scroll input, such as a swipe gesture, a keypad input, etc.

In another example, instead of section accessing system 138 modifying the metadata based upon the type of device on which it is to be rendered, section rendering component 190 on the device, itself, modifies the display. For instance, it may be that the section rendering component 190 already contains functionality for modifying the layout of the sections, based upon the screen size of display device 182. In that case, system 138 need not perform any type of device-dependent processing. Instead, the same metadata is returned for the sections 266-270, regardless of the type of device requesting it. It is the application using the device specifications and properties of the device, itself, that determines the layout of the sections 268-270, and renders them accordingly.

Figure 4A:
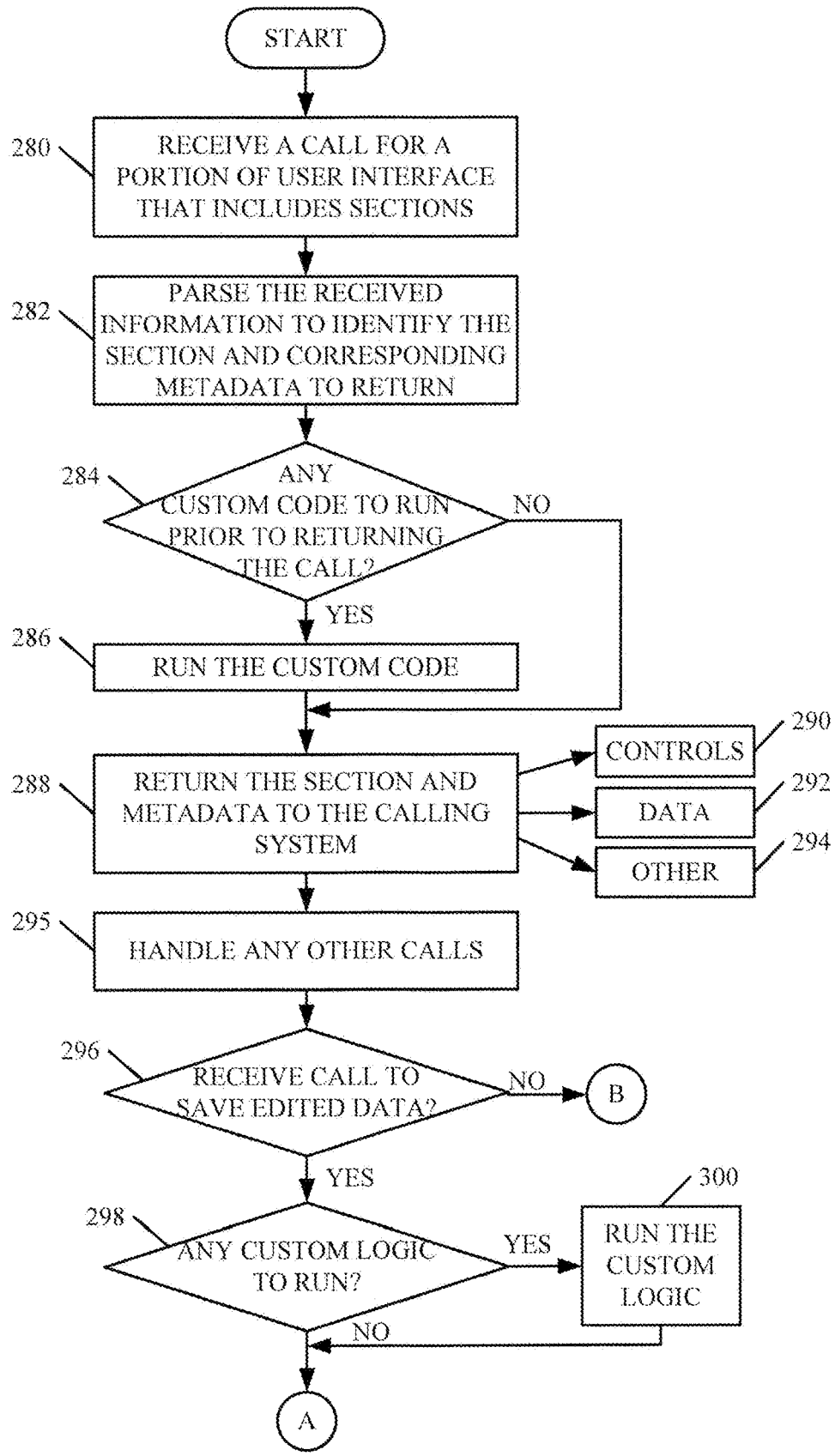
FIGS. 4A and 4B (collectively referred to herein as FIG. 4) show a flow diagram illustrating one example of the operation of a mobile device in the architecture of FIG. 1.
Figure 4B:
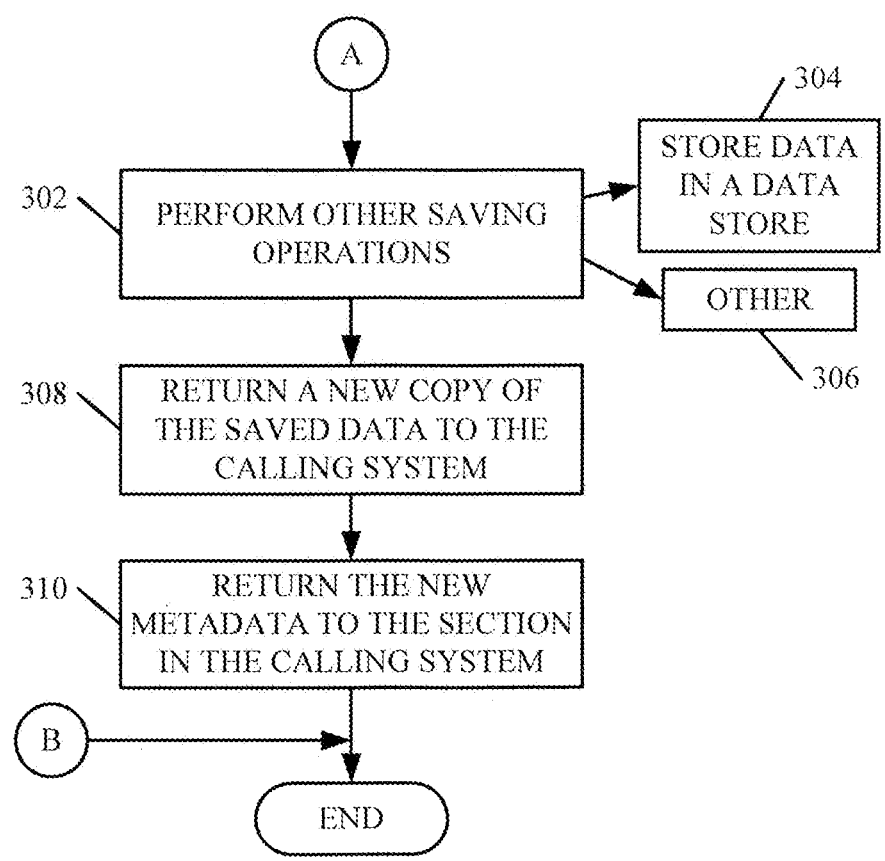

FIGS. 4A and 4B (collectively referred to herein as FIG. 4) show a flow diagram illustrating one example of the operation of computing system 102 in responding to a call from a client device, for sections to be rendered on a user interface display. Section accessing system 138 first receives a call for at least a portion of a user interface display that includes one or more sections. This is indicated by block 280 in FIG. 4. System 138 then parses the received information to identify the particular section 145 or 147 that is being requested. Context identifying component 140 can identify sections corresponding to any context information that is returned. Control identifying component 142 identifies the particular controls on the identified section, and data identifying component 144 identifies the data bound to those controls. Parsing the received information to identify the particular section being requested as well as the controls and data bound to those controls is indicated by block 282.

Custom logic component 148 then determines whether any custom code is to be run prior to returning the call. This is indicated by block 284. If so, then the custom code or custom logic is run as indicated by block 286, and the section and metadata are then returned to the calling system. This is indicated by block 288. Again, the return illustratively includes information indicative of the controls 290 that are to be displayed in the section, and the data 292 that is to be displayed in those controls. It can include other items 294 as well.

Computing system 102 can then wait for further calls. This is indicated by block 295.

If the data is editable, then save processing system 146 can receive another call from the client device to save edited data. This is indicated by block 296. If such a call is received, then save processing component 146 again determines whether any custom logic or custom code is to be run on the saved data. This is indicated by block 298. If so, the custom logic is run by custom logic component 148, as indicated by block 300. Save processing component 146 then performs other saving operations as indicated by block 302. For instance, it can store the data in a data store 149. This is indicated by block 304. It can perform other operations as well, as indicated by block 306.

Save processing component 146 then returns a new copy of the saved data to the calling system, as indicated by block 308. It also returns new metadata corresponding to the section in the calling system. This is indicated by block 310.

Figure 5:
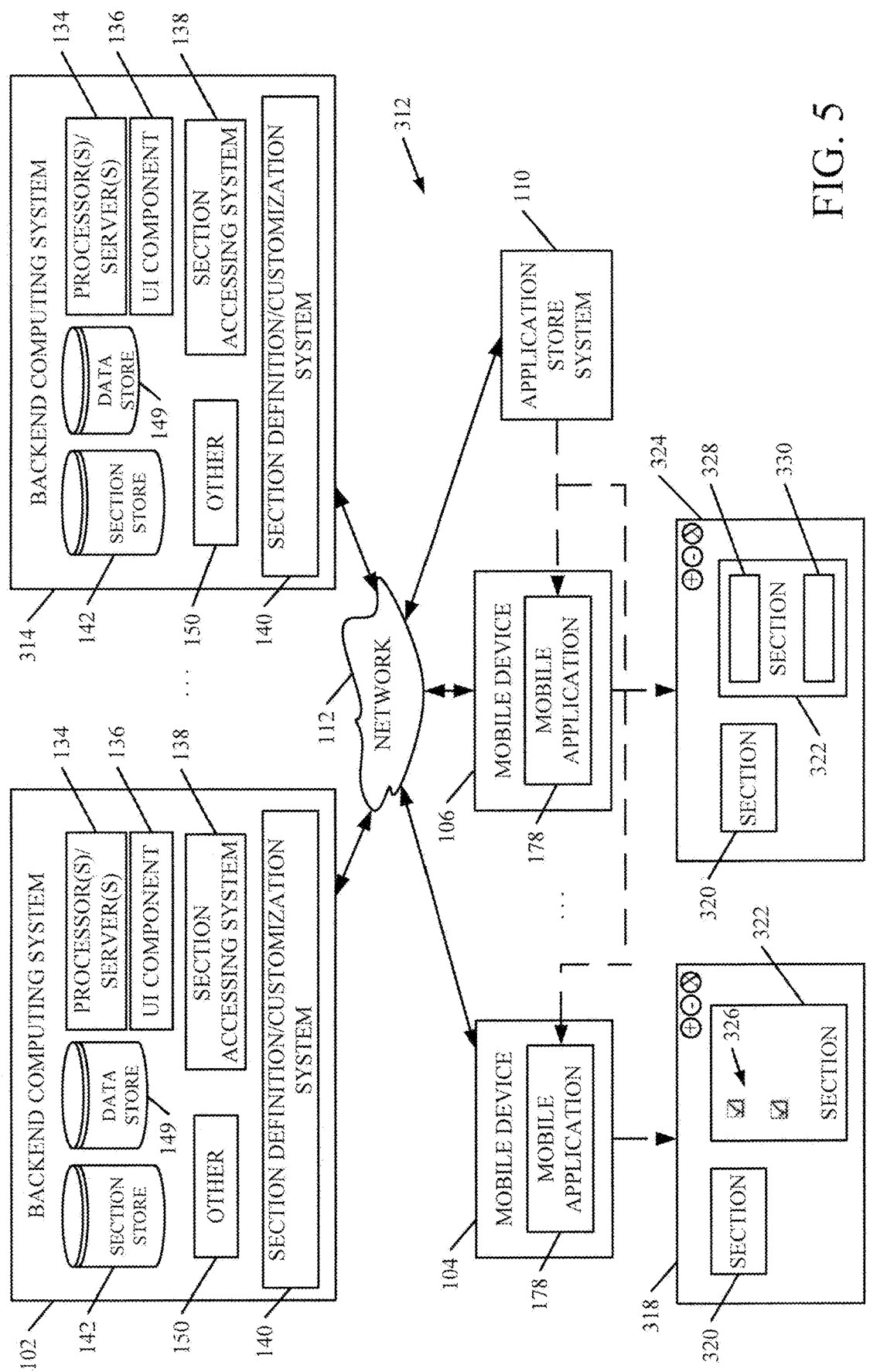
FIG. 5 is a block diagram of an architecture in which sections are supported by multiple backend computing systems.

FIG. 5 is a block diagram of another architecture 312. Architecture 312 is similar to architecture 100, except that it includes multiple different backend computing systems 102 and 314. In the architecture shown in FIG. 5, backend computing system 102 is deployed by one organization while backend computing system 314 is deployed by another. Also, the user of mobile device 104 is employed by the first organization and thus connects to backend computing system 102 with mobile device 104. The user of mobile device 106 is employed by the second organization and thus connects to backend computing system 314 with mobile device 106.

However, both mobile devices 104 and 106 have downloaded the same mobile application 178 from application store system 110. Because the backend computing systems 102 and 314 may have different administrators, those administrators can setup or configure the sections implemented by mobile application 178 differently, because they are for different organizations. This can be done by a developer or another person as well. Thus, when the user of mobile device 104 connects with backend computing system 102, mobile application 178 may call for information corresponding to a user interface display 318 that includes a set of sections 320-322. Mobile application 178, on device 106, may call backend computing system 314 for a user interface display 324 that includes one or more of the same sections. However, because the sections may be configured differently in section store 143 of backend computing system 102, than they are in section store 143 in backend computing system 314, the two different mobile devices 104 and 106 will generate different renderings of the same sections.

It can be seen, for instance, in the example shown in FIG. 5, that section 322 (as rendered by device 104) has a set of checkbox controls shown generally at 326. However, the same section 322 (as rendered by device 106) has a set of text box controls 328 and 330, instead of check box controls 326. Thus, the same mobile application 178 can generate two completely different user interface displays, even for the same section, because those sections are modified differently in the corresponding backend computing systems 102 and 314.

Figure 6:
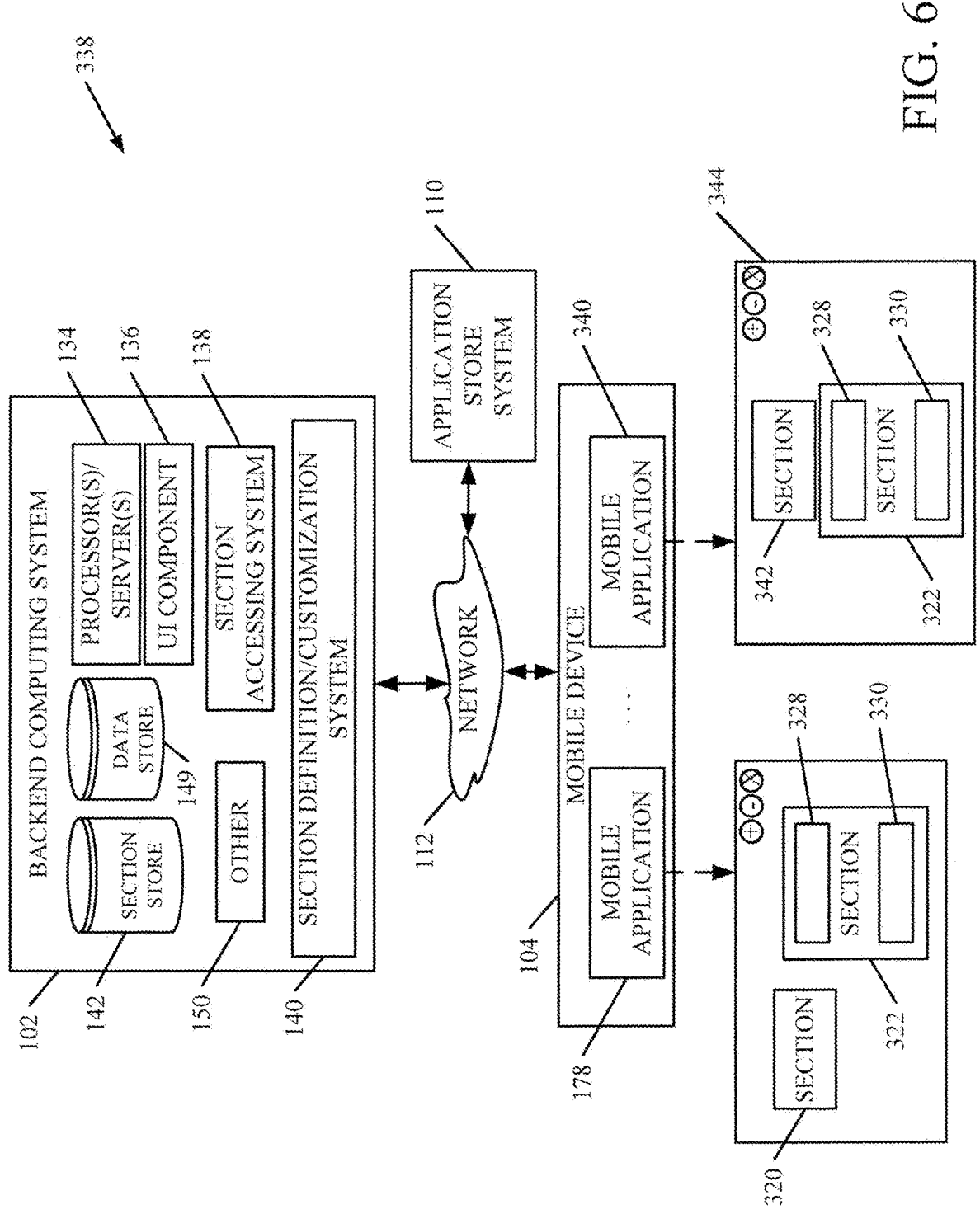
FIG. 6 is a block diagram of an architecture in which sections are reused among a plurality of different mobile applications.

FIG. 6 shows another example architecture 338. Architecture 338 is similar to architecture 100, shown in FIG. 1, except that it shows that mobile device 104 now has downloaded two different mobile applications 178 and 340 from application store system 110. It may be that both applications 178 and 340 render user interface displays that use some of the same sections stored in section store 142 of backend computing system 102. If that is the case, then if that section is somehow customized by an administrator, a developer, etc., the customization will be rendered by both applications 178 and 340, when they access that particular section for rendering. This is done without modifying either application 178 or 340.

For instance, FIG. 6 shows that mobile application 178 accessed backend computing system 102 and has obtained data for, and rendered, sections 320 and 322. Section 322 has been customized to include two text boxes 328 and 330, with customized data. Mobile application 340 has also accessed backend computing system 102 and obtained data for, and rendered, section 322, although it is displayed on an entirely different user interface display 344. Display 344 displays sections 342 and 322. It can be seen that, while mobile application 340 is a completely separate application from application 178, because it accesses the same section 322, any modifications or customizations made to section 322 at backend computing system 102 are rendered using both applications 178 and 340. Thus, even in display 344, section 322 has the custom controls 328 and 330, along with any customized data corresponding to them.

An example of this may be helpful. Assume that an organization has an application 178 that is used for entering expenses. Application 178 has a user interface display screen that uses a custom field that allows the user to identify a "department" for the expense. It may also be that the organization has another application 340 that allows a supervisor to approve the expenses. In such a case, it may be that a display screen in the second mobile application 340 will also use a field identifying the "department". In that case, when the section 322 is configured to identify a "department", that particular customization will be reflected in both the application 178 that is used to enter expenses, and the application 340 that is used to approve them, because both applications will refer to that same section.

This significantly enhances the ability of an administrator or developer to implement customizations, because they need to be made only in a single place. The customizations will be reflected in all client-based applications that access the section that includes those customizations.

In addition to the advantages discussed above, it can be see that the present discussion provides a number of other technical advantages as well. It advantageously allows users of mobile applications to download the same application, but the customizations made by an organization supporting a backend computing system can be used by the application to generate customized renderings of user interface displays. At each organization, they can be accessed by the same mobile application but result in a completely different rendering. This enables customizations to be made without modifying the client-based application, and thus increases the productivity of developers, and reduces errors involved in implementing customizations. The present discussion also advantageously allows for a different approach for handing different versions of the same client-based application, on different platforms. In architectures where the backend computing system is the same across applications for a given customer, the backend computing system can choose to return metadata that is optimized to each platform that is requesting it, while still sharing business logic for those customizations. The present discussion provides extensibility because the sections can be controlled by the backend computing system using a combination of metadata and data. This allows organizations to add their own functionality to the applications without having to react to new versions of the base applications. The sections can be used across applications so one customization results in multiple applications changing to reflect the customization. The sections can be used across platforms so a single customization can result in different application implementations, on different platforms, changing to reflect the customization. Sections can render a different user interface element based on the user, based on entity types shown in the user interface display, or even based upon the entity itself. The sections support both reading and writing functionality and different backend computing systems can support their own customizations. At the same time, only a single client-based application needs to be implemented by the different users of the different backend computing systems. The same application will pick up customizations from the backend computing system to which it is connected. Thus, there is no need for each organization that uses a different backend to manage the client-based applications at the level of the application store system.

It will also be noted that the present discussion has discussed how sections are built and how this is related to the visual aspects of the user interface. It will be appreciated, however, that information for a section can also be sent and used by an accessibility system to generate an audio representation of the section (e.g., to read the content of a section out loud.). This is but one example.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
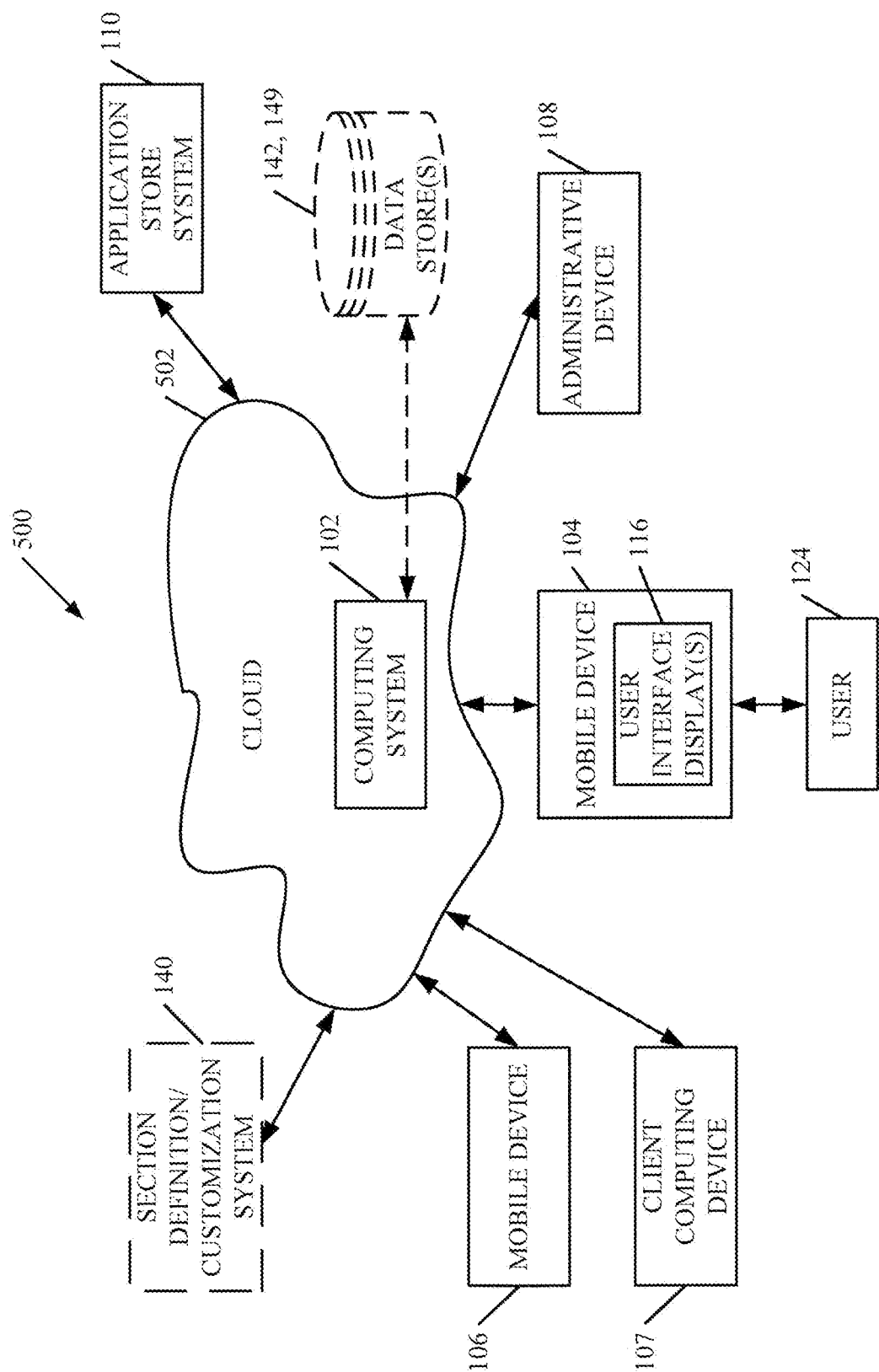
FIG. 7 is a block diagram of one example of the architecture shown in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 7, some items are similar to those shown in FIG. 1 and they are similarly numbered. FIG. 7 specifically shows that computing system 102 can be located in cloud 502 (which can be public, private, or a combination where portions are public while others are private). Therefore, user 124 uses a mobile device 104 to access those systems through cloud 502.

FIG. 7 also depicts another example of a cloud architecture. FIG. 7 shows that it is also contemplated that some elements of computing system 102 can be disposed in cloud 502 while others are not. By way of example, data stores 142, 149 can be disposed outside of cloud 502, and accessed through cloud 502. In another example, section definition/customization system 140 or other systems can be outside of cloud 502. Regardless of where they are located, they can be accessed directly by administrative device 108, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
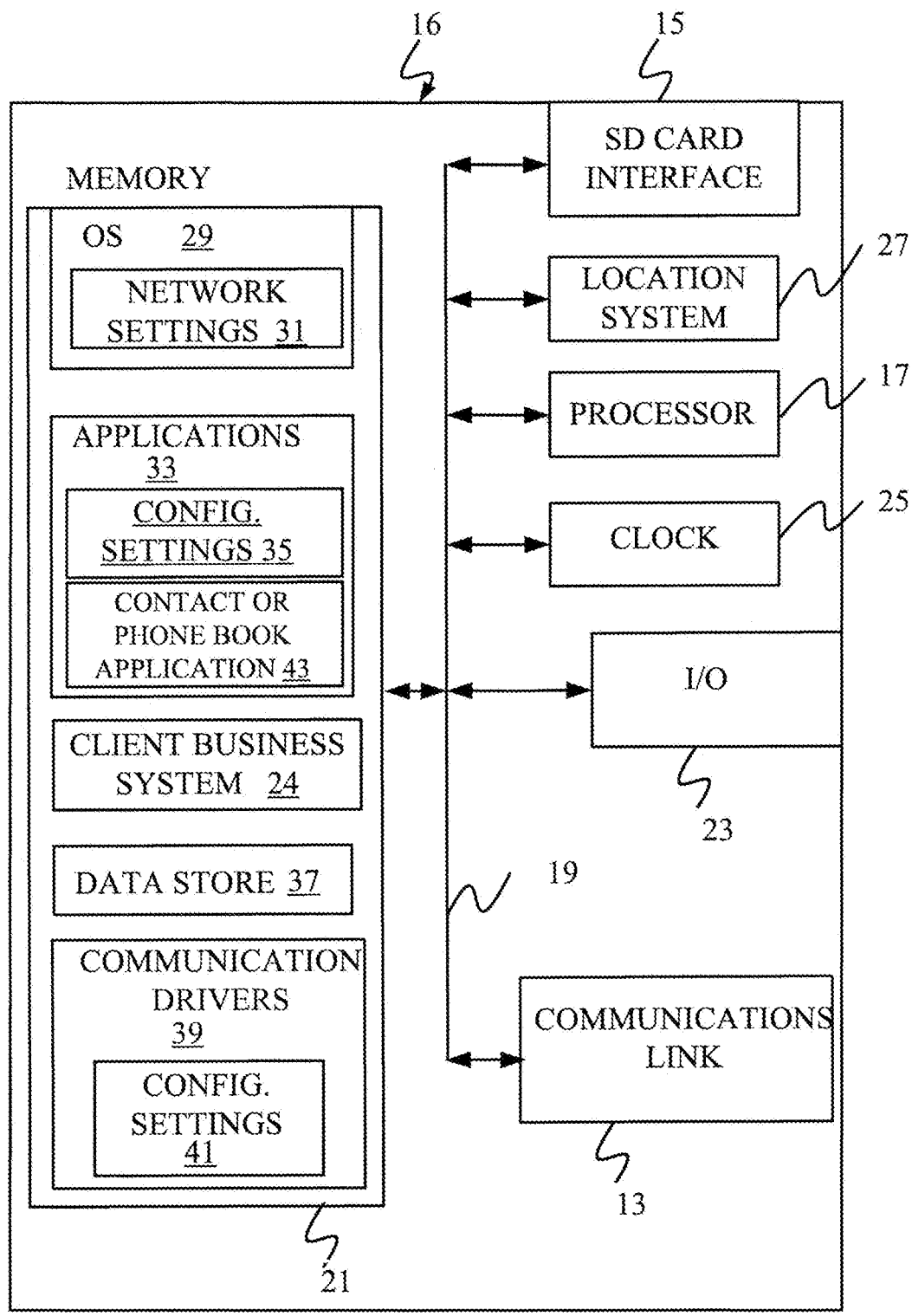
FIGS. 8-10 show examples of mobile devices.
Figure 9:
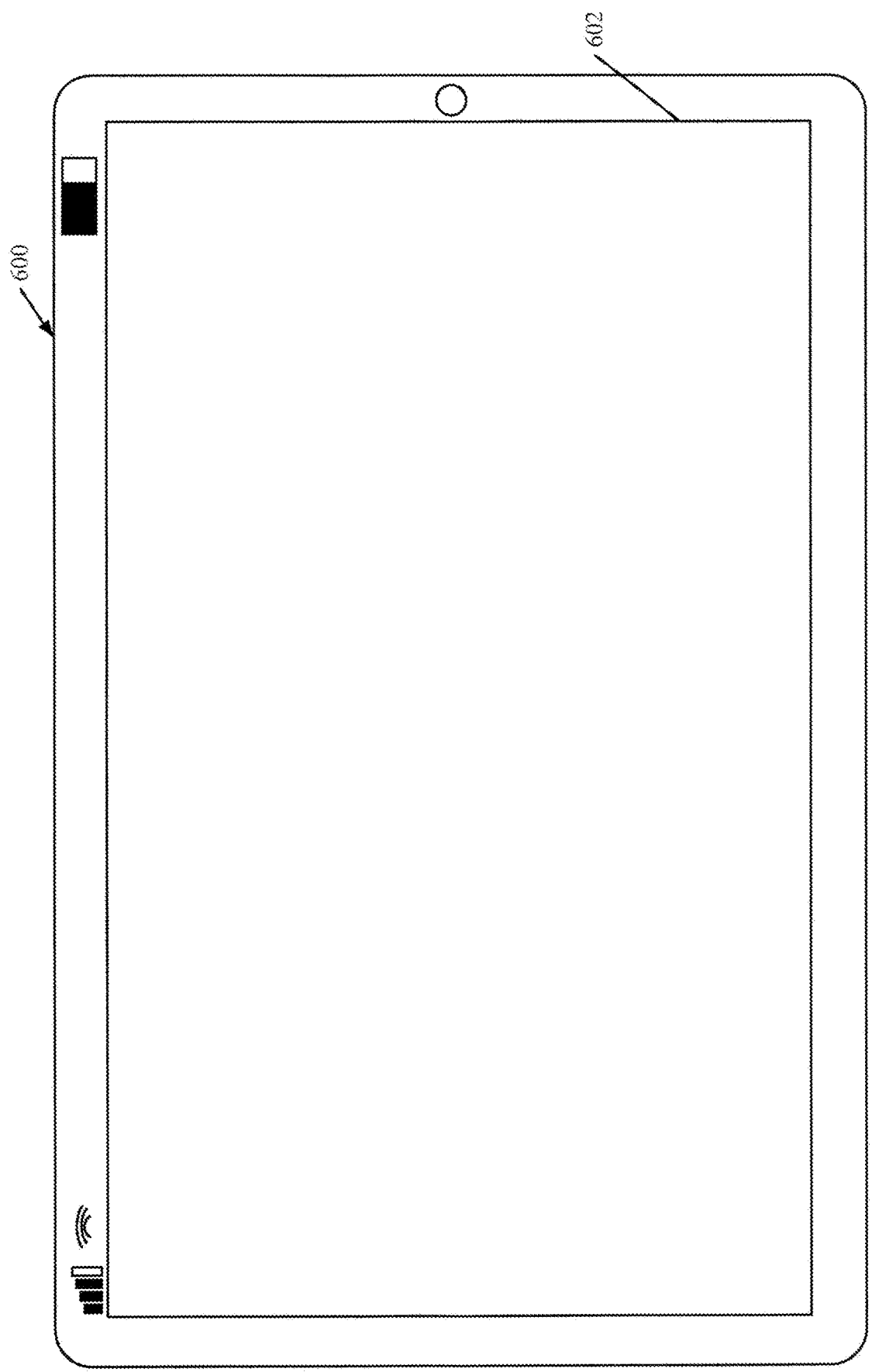
Figure 10:
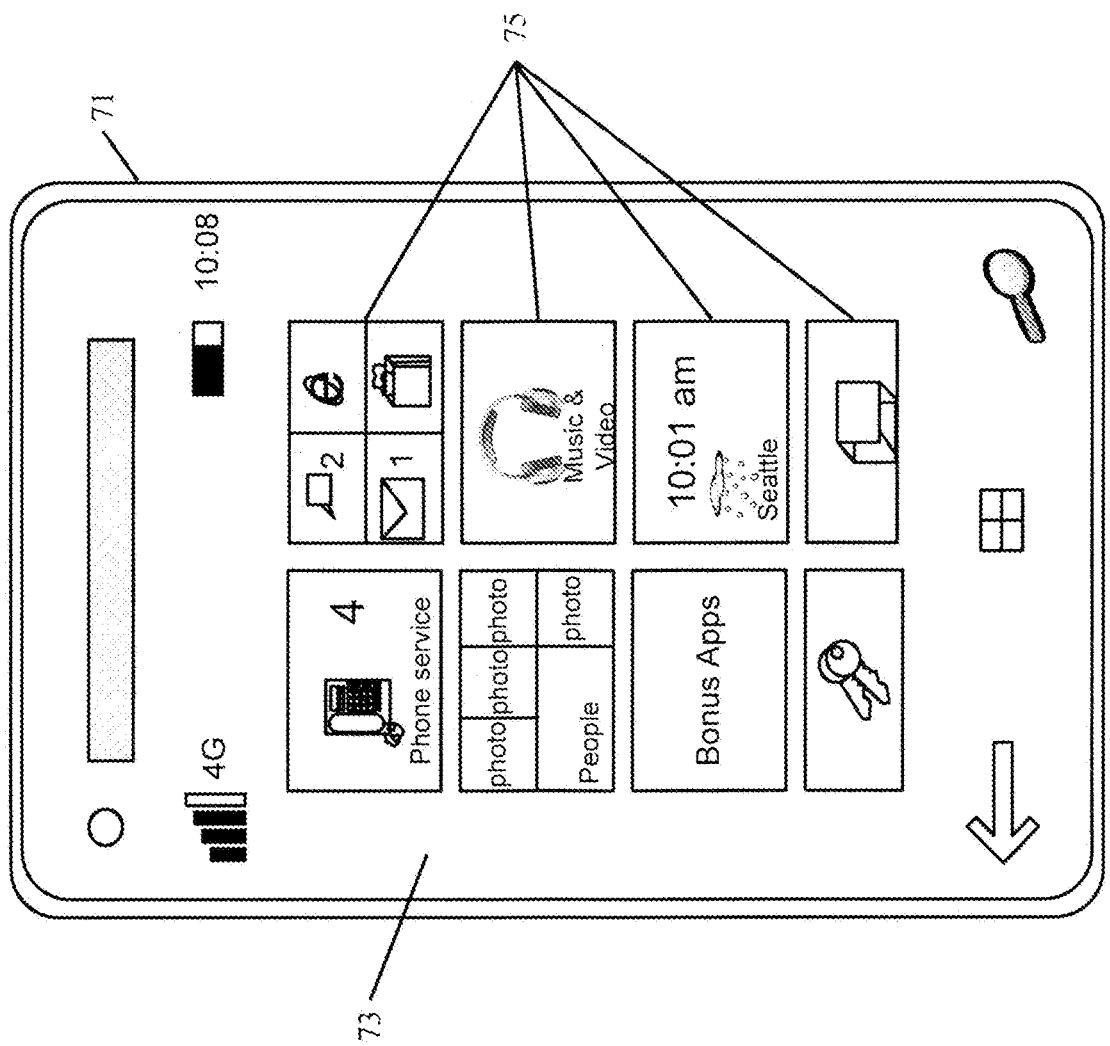

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communications link 13 communicate with a processor 17 (which can also embody processors 134, 172 or 198 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system.

It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of application component 114. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of device 16 can be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples, the phone also includes a Secure Digital (SD) card slot that accepts a SD card.

The mobile device can also be a personal digital assistant (PDA) or a multimedia player or a tablet computing device, etc. (hereinafter referred to as a PDA). The PDA include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. FIG. 10 shows that the mobile device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
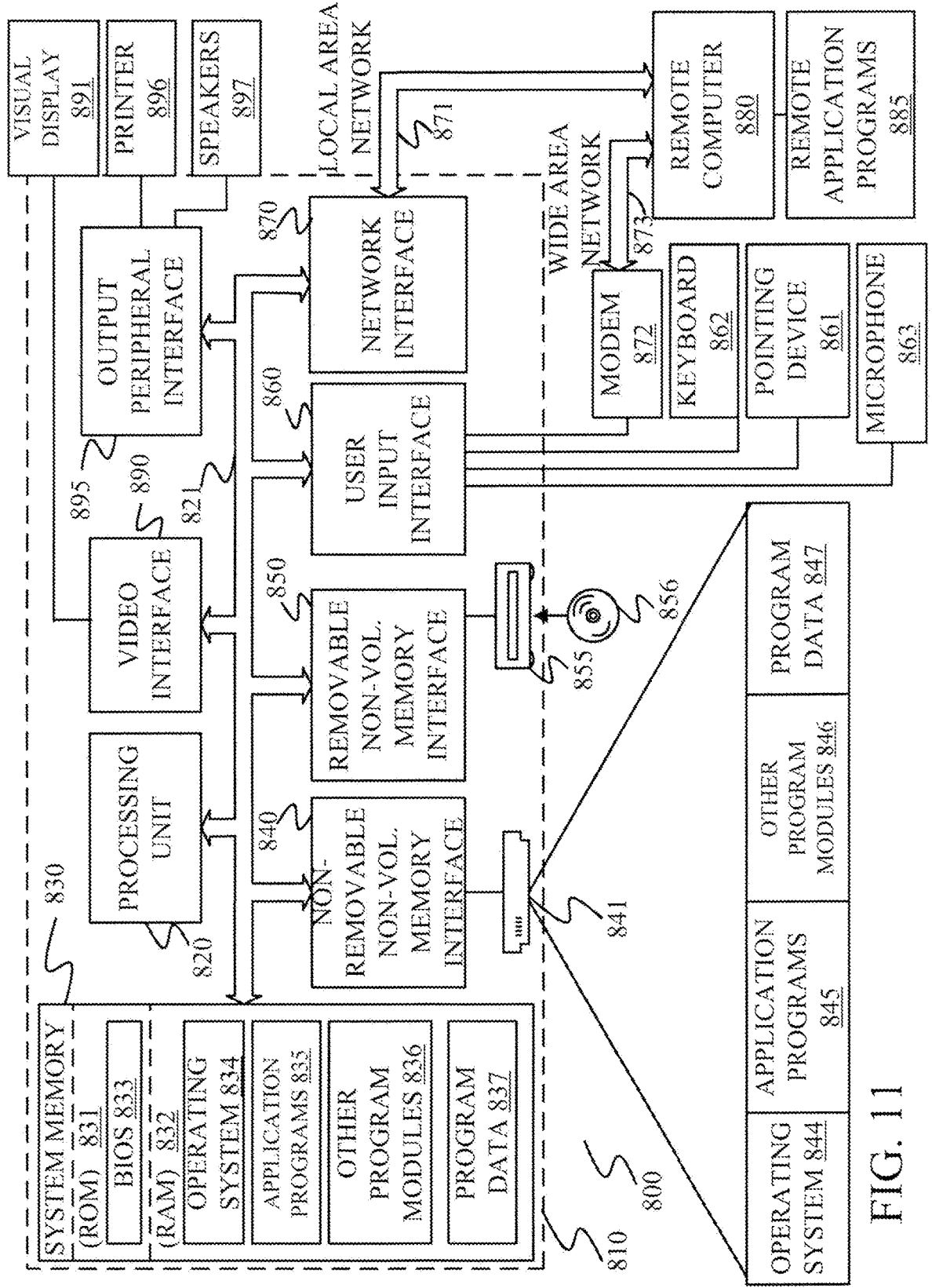
FIG. 11 is a block diagram of one example of a computing environment that can be used in any of the architectures of the previous figures.

FIG. 11 is one example of a computing environment 800 in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processor 134, 172 or 198 or those in other devices), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (such as ASICs), Program-specific Standard Products (such as ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

A first example includes a computing system, comprising:
an application programming interface, exposed by the computing system, that receives a call from a client application for a user interface display that has a plurality of different predefined sections thereon, the call including section identifying metadata;
a section accessing system that parses the call to identify the plurality of different sections on the user interface display;
a control identifying component that accesses section definition metadata corresponding to each of the identified sections and identifies control metadata indicative of controls that are displayed on each of the identified sections; and
a data identifying component that accesses the section definition metadata and identifies data binding metadata, corresponding to each of the identified sections, indicative of data bound to each of the controls, the application programming interface returning the call by returning the control metadata and the data binding metadata for rendering each of the plurality of identified sections on the user interface display, at the client application.

Another example comprises computing system of any or all previous examples and further comprising:
a context identifying component that accesses context information in the call and identifies the sections based on the context information.

Another example comprises computing system of any or all previous examples and further comprising:

Another example comprises the computing system of any or all previous examples and further comprising:
a custom logic component that determines whether custom logic is to be run for any of the identified sections prior to returning the call and, if so, runs the custom logic prior to returning the call.

Another example comprises the computing system of any or all previous examples wherein the application programming interface returns the call with edit metadata identifying different ones of the plurality of identified sections that are editable sections.

Another example comprises the computing system of any or all previous examples and further comprising:
a save processing component that receives, from the client application through the application programming interface, a save call including edited data corresponding to a given editable section and saves the edited data for the given editable section.

Another example comprises the computing system of any or all previous examples wherein the save processing component returns updated metadata, that is updated based on the edited data, through the application programming interface, to the client application.

Another example comprises the computing system of any or all oprevious examples and further comprising:
a section definition generator that detects section definition inputs and generates section definition metadata defining a new section based on the section definition inputs and stores the section definition metadata for the new section in a section store.

Another example comprises any or all previous examples and further comprising:
a section definition modifier that detects section modification inputs and modifies section definition metadata for a given section based on the section modification inputs and stores the modified section definition metadata for the given section in the section store.

Another example comprises a computing system, comprising:
a display device;
a user interface component; and
an application component that runs an application that controls the user interface component to display, on the display device, a user interface display that has a plurality of predefined sections and that calls to a backend system to receive section metadata for each of the predefined sections on the user interface display, receives the section metadata and controls the user interface component to display the predefined sections on the display device based on the section metadata received from the backend system.

Another example comprises the computing system of any or all previous examples and further comprising:
a backend connection component, controlled by the application component to call the backend system, through an application programming interface exposed by the backend system, to receive a set of section metadata each time the application component displays a different user interface display.

Another example comprises the computing system of any or all previous examples wherein the application component comprises:
a section request component that identifies a section to be displayed on the user interface display and controls the backend connection component to call the backend system for the section metadata for the identified section.

Another example comprises the computing system of any or all previous examples wherein the section request component identifies the section to be displayed by determining a section identifier identifying the section to be displayed, an entity type for which the user interface display is to be displayed, and a set of identifying data that identifies the data bound to the section to be displayed.

Another example comprises the computing system of any or all previous examples and further comprising:
an application context identifier that identifies an application context of the application running on the computing device and provides the application context to the section request component.

Another example comprises the computing system of any or all previous examples wherein the section request component identifies the section to be displayed by determining a device type identifier that identifies a device type of a device on which the computing system is deployed and a user identity identifying the user of the device.

Another example comprises the computing system of any or all previous examples wherein the section request component controls the backend connection component to call the backend system with the section identifier, the entity type, the identifying data, the application context, the device type and the user identity.

Another example comprises the computing system of any or all previous examples wherein the application component further comprises:
a metadata parsing component that parses the section metadata to identify rendering information; and
a section rendering component that renders the section on the user interface display based on the rendering information.

Another example comprises a computer implemented method, comprising:
receiving a call from a first client application, deployed on a first client device, for a user interface display that has a plurality of different predefined sections thereon, the call including section identifying metadata;
parsing the call to identify the plurality of different sections on the user interface display based on the section identifying metadata;
identifying control metadata indicative of controls that are displayed on each of the identified sections;
identifying data binding metadata, corresponding to each of the identified sections, indicative of data bound to each of the controls; and
returning the call by returning section rendering metadata comprising the control metadata and the data binding metadata for rendering each of the plurality of identified sections on the user interface display, at the client application.

Another example comprises the computer implemented method of any or all previous examples and further comprising:
receiving a call from a second client application for a user interface display that has at least a given one of the plurality of different predefined sections; and
returning different section rendering metadata to the second client application, for the given section, than is returned to the first client application.

Another example comprises the computer implemented method of any or all previous examples and further comprising:
receiving a call from a second client application for a user interface display that has at least a given one of the plurality of different predefined sections; and
returning a same set of section rendering metadata to the second client application, for the given section, as is returned to the first client application.

Another example comprises the computer implemented method of of any or all oprevious examples and further comprising:

receiving a call from the first client application, deployed on a second client device, for the user interface display; and returning a same set of section rendering metadata to the first client application on the second client device as is returned to the first client application deployed on the first client device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising;
a processor; and
memory storing instructions executable by the processor, wherein the instructions, when executed, cause the computing system to;
   receive, from a client computing device that is separate from the computing system, a communication that includes a plurality of section identifiers corresponding to a user interface display associated with a client application on the client computing device, wherein each section identifier uniquely identifies a requested section on a portion of the user interface display;
   for each section of the plurality of requested sections, obtain corresponding section definition information that corresponds to the requested section and defines one or more user interface controls on the requested section; and
   send, to the client computing device, the section definition information for the plurality of requested sections.

2. The computing system of claim 1, wherein each requested section comprises a predefined section on the user interface display.

3. The computing system of claim 1, wherein the instructions cause the computing, system to:
   send, to the client computing device, an edit identifier that identifies which of the plurality of requested sections are editable sections.

4. The computing system of claim 3, wherein the instructions cause the computing system to:
   receive, from the client computing device, a save request including edited data corresponding to a particular one of the editable section; and
   save the edited data for the particular editable section.

5. The computing system of claim 4, wherein the instructions cause the the computing system to:
   return, to the client computing device, updated data that is updated based on the edited data.

6. The computing system of claim 1, wherein the section definition information for each corresponding section defines a data binding that indicates data bound to each user interface control on the. corresponding section.

7. The computing system of claim 1, wherein the instructions cause the computing system to:
   access context information in the communication;
   identify the requested sections based on the context information;
   determine that custom logic is to be run for one or more the requested sections prior to sending the response to the communication; and
   based the determination, run the custom logic prior to sending the response.

8. A computing system, comprising:
a processor; and
memory storing instructions executable by the processor, wherein the instructions, when executed, cause the computing system to:
   receive an indication of a user interface display associated with a client application on the computing system, the user interface display comprising a plurality of predefined sections;
   send a communication to a remote computing system that is remote from the computing system,
      the communication including a plurality of section identifiers, wherein each section identifier uniquely identifies one of the predefined sections on the user interface display;
   receive, based on the communication, section definition information that corresponds to each predefined section of the plurality of predefined sections; and
   based on the received section definition information, generate a representation of the user interface display with the plurality of predefined sections.

9. The computing system of claim 8, wherein the section definition information defines, for each predefined section, one or more user interface controls on the predefined section.

10. The computing system of claim 8, wherein the instructions cause the computing system to:
    identify each particular section to be displayed by detenriining a section identifier identifying the particular section, an entity type corresponding to the user interlace display, and a set of identifying data that identifies the data bound to the particular section.

11. The computing system of claim 10, wherein the instructions cause the computing system to;
    identify an application context of the client application; and
    communication the remote computing system based on the application context.

12. The computing system of claim 11, wherein the instructions cause the computing system to:
    identify the plurality of predefined sections based on:
       a device type identifier that identifies a device type of a device on which the computing system is deployed; and
       a user identity associated with a user of the device.

13. The computing system of claim 12, wherein the instructions cause the computing system to:
    call the remote computing system with the section identifier, the entity type, the identifying data, the application context, the device type and the user identity.

14. The computing system of claim 8, wherein the instructions cause the computing system to:
    parse the section definition information to identityrendering information; and
    render the predefined section based on the rendering information.

15. A computer implemented method comprising:
receiving, by a computing system, a communication from a client computing device that is separate from the computing system, the communication being associated with a client, application on the client computing device, and including a plurality of section identifies;

indentifying a plurality of requested sections on a user interface display for the client application based on the plurality of section identifiers;

obtaining section definition information that corresponds to each requested section and defines one or more user interface controls on the requested section; and sending, to the client computing device, the section definition information.

16. The computer implemented method of claim 15, wherein the client application comprises a first client application, and the method further comprises:

receiving, by the computing system, a second communication from a second client application, the second communication being associated with a second user interface display that has the, requested section; and returning, to the second client application, second section definition information that is different than the section definition information returned to the first client application.

17. The computer implemented method of claim 15, wherein the client application comprises a first client application, and further comprising:

receiving, by the computing system, a second communication from a second client application, the second communication being associated with a second user interface display that the requested section; and returning, to the second client application, second section rendering metadata for the particular section that comprises same section definition information as the section definition information returned to the first application.

18. The computer implemented method of 15 and further comprising:

receiving, by the computing system, a communication from the first client application, deployed on a second client device; and returning a same set of section, definition information to the first client application on the second client device as is returned to the first client application deployed on the first client device.

* * * * *